Feb. 27, 1923.
F. W. BRANDT ET AL
COMBINED AXLE AND WHEEL
Filed Aug. 25, 1922
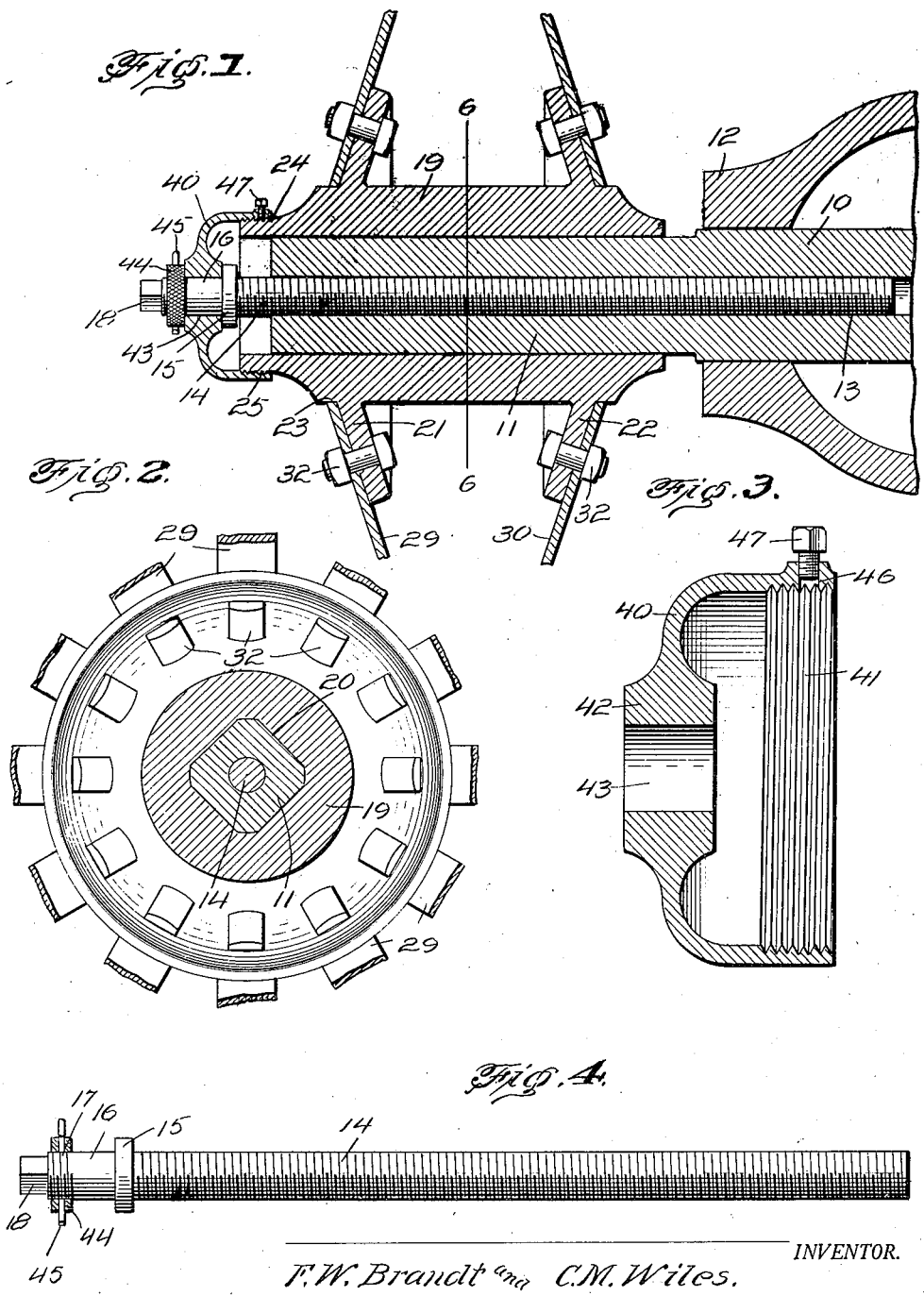
INVENTOR.
F. W. Brandt and C. M. Wiles.
BY
Geo. P. Kimmel
ATTORNEY.

Patented Feb. 27, 1923.

1,447,011

UNITED STATES PATENT OFFICE.

FRIEDRICH W. BRANDT AND CARL M. WILES, OF COLUMBUS, TEXAS.

COMBINED AXLE AND WHEEL.

Application filed August 25, 1922. Serial No. 584,304.

*To all whom it may concern:*

Be it known that we, FRIEDRICH W. BRANDT and CARL M. WILES, citizens of the United States, residing at Columbus, in the county of Colorado and State of Texas, have invented certain new and useful Improvements in Combined Axles and Wheels, of which the following is a specification.

This invention relates to a combined axle and wheel for tractors, and has for its object to provide, in a manner as hereinafter set forth, the axle and wheel with cooperating elements to provide for the adjusting of the wheel lengthwise with respect to the axle, whereby the treads of the rear wheels of the tractor can be adjustably positioned, in spaced relation, with respect to each other, at varying distances, preferably from 5 to 7 feet apart or a smaller or greater distance when desired, to provide for the satisfactory working of the ground by the ground working instrument attached to the tractor, or to provide for any other desirable purposes.

A further object of the invention is to provide, in a manner as hereinafter set forth, a combined axle and wheel for the purpose referred to, and to further provide, the wheel with ground gripping elements, as hereinafter referred to, to facilitate the traction of the wheel during the travel of the tractor.

Further objects of the invention are to provide a combined axle and wheel, which are simple in their construction and arrangement, strong, durable, readily set up, efficient in their use, conveniently adjusted, one relatively to the other, readily assembled and comparatively inexpensive.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a fragmentary view in longitudinal section, of the axle and wheel,

Figure 2 is a section on line 6—6, Figure 1,

Figure 3 is a longitudinal sectional view of the coupling cap between the hub of the wheel and the axle, Figure 4 is a side view of the adjusting element, carried by the axle, for the wheel and which is coupled with the hub of the wheel by the coupling cap.

Referring to the drawings in detail, 10 denotes an axle section having its outer portion reduced to provide a spindle 11, which is polygonal in cross section, as shown in Figure 2 of the drawings. The bearing 12 is provided for the axle section 10, and the latter is formed with a longitudinally extending bore 13, having the wall thereof threaded and engaging with said threaded wall is an adjusting screw 14. The screw 14, projects outwardly from the axle section 10, and is formed with an integral collar 15, and an extension 16, the latter has the major portion of its periphery smooth and the other portion thereof threaded as at 17. At the outer end of the extension 16, a reduced polygonal portion 18 is formed and which is adapted to receive a wrench or other tool for the purpose of rotating the screw 14, when it is desired to adjust the hub of the wheel lengthwise with respect to the spindle 11.

Shiftably mounted on the spindle 11, is the hub 19, of a traction wheel, and the said hub 19 has a polygonal shaped bore 20, which corresponds to the shape of the spindle 11, so that when the axle section 10 is revolved, the hub will be carried therewith. The polygonal shaped bore 20, in connection with the polygonal shaped spindle 11, provides inherent means for the rotation of the hub 19, with the spindle 11. The hub 19, is formed with a pair of integral annular collars 21, 22, which extend toward each other at an inclination, and are positioned on the hub 19, in a manner to provide seats 23, extending outwardly with respect to the inner terminus of each of the collars 21, 22. The outer end of the hub 19, is reduced as at 24, and further peripherally threaded as at 25, for a purpose to be presently referred to.

Connected to the outer faces of the collars 21, 22, are spokes 29, 30, which are fixedly secured in position, by the hold-fast devices 32, these latter consisting of headed nuts and bolts, the bolts being arranged to extend outwardly from the collars 21, 22, and the nuts are positioned on the outer ends of the bolts and abut against the inner ends of the spokes 29, 30.

Associated with the hub 19, for the purpose of connecting it with the adjusting screw 14, is a cylindrical coupling cap 40, having interior threads which are adapted to engage with the threads 25, for the purpose of securing the cap 40 to the hub 19. The outer portion of the cap 40, centrally thereof, is enlarged as at 42, and formed with a centrally disposed opening 43 for the passage of the extended portion 16, of the adjusting screw. When the coupling cap 40 is mounted in position, it abuts against the collar 15.

For connecting the cap 40, with the screw 14, so that the cap will shift inwardly with the screw 14, when the latter is adjusted inwardly, the threaded part of the extended portion 16, of the screw 14, has engaged therewith an interiorly threaded nut or collar 44, which is fixedly secured in position by a cotter pin 45. The collar 44, co-acts to carry the coupling cap 40, inwardly, shifting the hub 19 in a like direction, when the screw is moved inwardly with respect to the axle section 10, and the collar 15 co-acts with the coupling cap 40, to shift the latter outwardly, which carries the hub 19 therewith, when the screw 14, is moved outwardly with respect to the axle section 10.

The coupling member 40 is formed with a threaded opening 46, in which is mounted a clamping screw 47, the latter is extended through the opening 46 and engages with the reduced portion of the hub 19, for the purpose of securing the cap members 40, to the hub 19, so that the cap member cannot be accidentally displaced.

The coupling cap member 40, not only constitutes a means for connecting the hub with the adjusting screw to provide for the shifting of the hub when such screw is actuated, but furthermore incloses the outer end of the hub and also acts as a bearing for the outer end of the screw, when the latter is rotated to adjust the hub, and further cooperates as an abutment for either of the collars.

From the foregoing construction and arrangement of parts, it is obvious that the hub 19, can be shifted on the spindle 11, to the desired point, by the adjusting of the screw 14, whereby when the screw is adjusted in one direction, the hub will be carried therewith, and when adjusted in the other direction, the hub will be carried therewith. By this arrangement the treads of the rear wheel of the tractor can be adjusted relatively to each other in spaced relation, and further maintained in the position to which they have been adjusted and by such provision arrangement is made whereby the satisfactory operation of the ground working tool, which is attached to the tractor, can be had and further by this arrangement, the rear wheels of the tractor can be adjusted to travel over the ground at the point desired.

What we claim is:—

1. In combination, a rotatable axle, a wheel hub rotatable therewith and shiftably mounted thereon, an adjustable element mounted in the axle, and a coupling cap secured to the hub and connected with said element to provide for the shifting of the hub on the axle when said element is adjusted.

2. In combination, an axle section provided with a spindle polygonal in cross section, a wheel hub having a bore corresponding in contour to the shape of the spindle and mounted on the spindle, said hub rotatable with the spindle and shiftably mounted thereon, a longitudinally extending adjusting element mounted in the spindle and extending in the axle body, and a coupling cap operatively connected with the outer end of said element and secured to said hub for shifting the latter on the spindle when said element is adjusted.

3. In combination, a rotatable axle section, a wheel hub mounted thereon and rotatable therewith, and further shiftable in the direction of the length of the axle section, an adjustable element engaging with the axle section and projecting outwardly therefrom, a coupling cap secured to the hub and projecting outwardly therefrom, said element extending through and rotatable in said coupling cap, and means mounted on the projecting end of said element for connecting said cap therewith, whereby when said element is adjusted the hub will be shifted in a direction lengthwise of the axle section.

4. In combination, a rotatable axle section, a hub mounted thereon, said hub and axle section having inherent means to provide for the rotation of the hub with the spindle, an adjusting element carried by the axle section and projecting therefrom, a coupling cap member fixedly secured to the hub and projecting outwardly therefrom and having said element extending therethrough, and said cap member and element having cooperating means to cause the shifting of the hub on the axle section when said element is operated.

5. In combination, a rotatable axle section, a hub mounted thereon, said hub and axle section having inherent means to provide for the rotation of the hub with the spindle, an adjusting element carried by the axle section and projecting therefrom, a coupling cap member fixedly secured to the hub and projecting outwardly therefrom and having said element extending therethrough, and said cap member and element having cooperating means to cause the shifting of the hub on the axle section when said element is operated, said cap member further providing means for inclosing the outer end of the hub.

In testimony whereof, we affix our signatures hereto.

FRIEDRICH W. BRANDT.
CARL M. WILES.